Aug. 15, 1961 R. P. POWERS 2,996,096
PNEUMATIC TIRE AND RIM
Filed Nov. 6, 1958 2 Sheets-Sheet 1
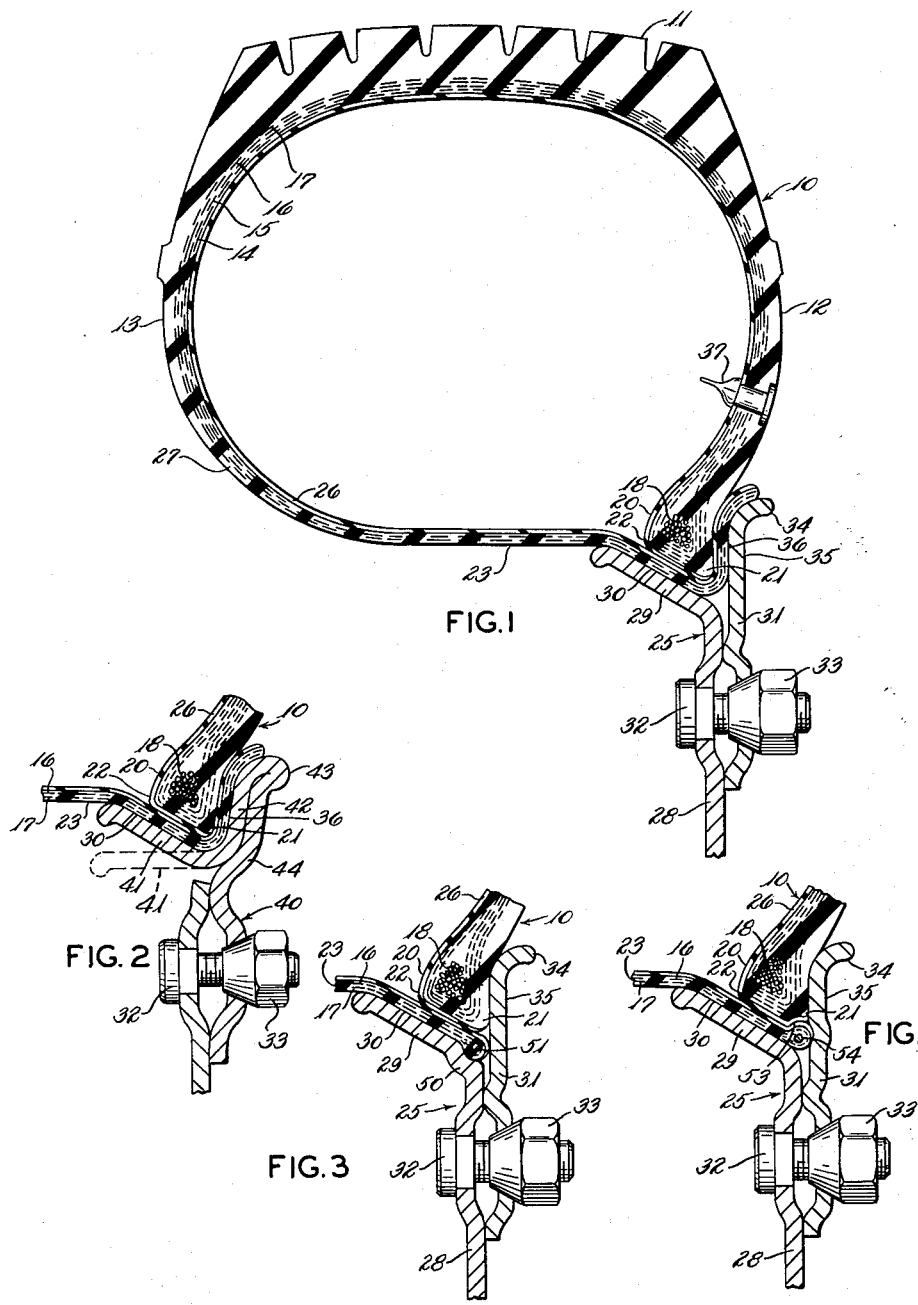
INVENTOR.
ROBERT P. POWERS
BY W. A. Fraser
ATTY.

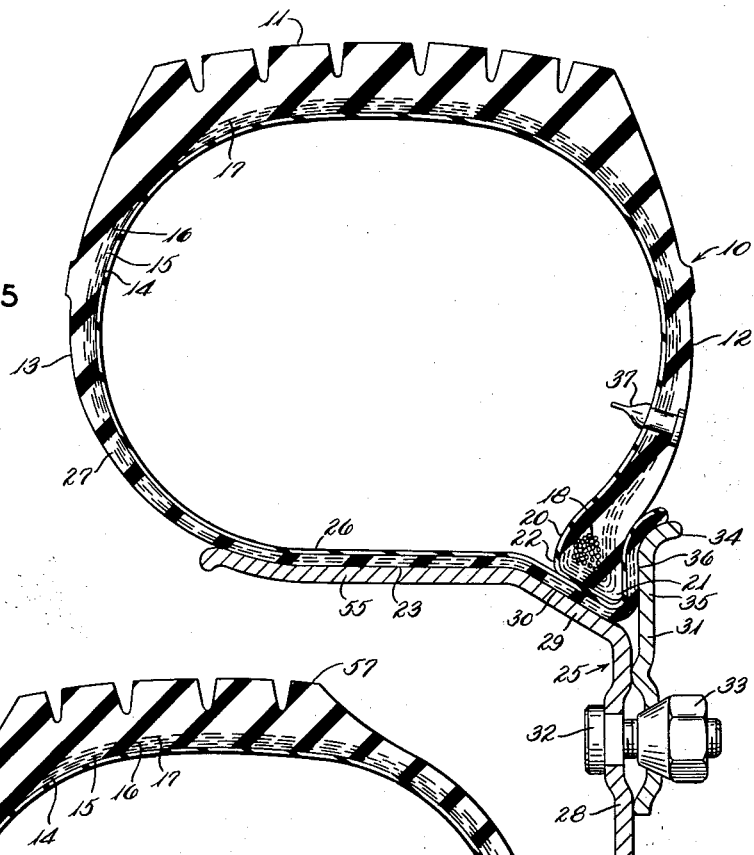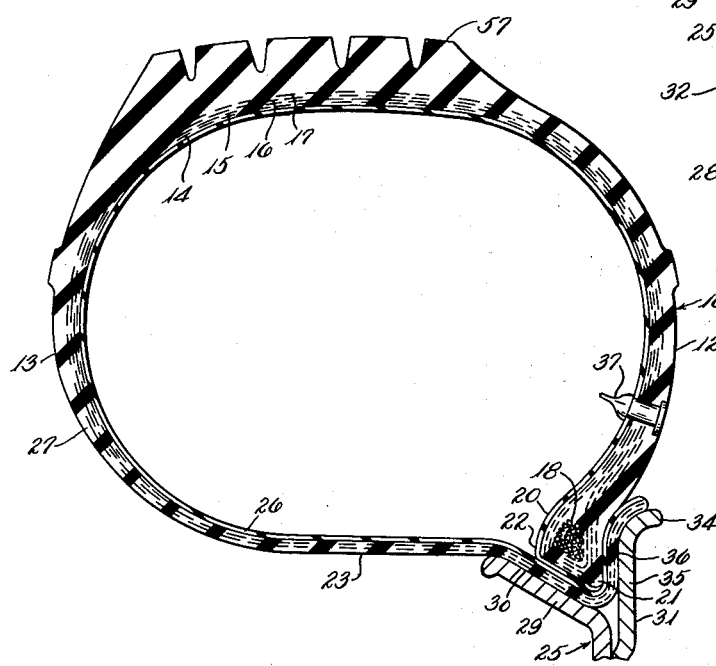

2,996,096
PNEUMATIC TIRE AND RIM
Robert Pope Powers, Akron, Ohio, assignor to The Firestone Tire & Rubber Company, Akron, Ohio, a corporation of Ohio
Filed Nov. 6, 1958, Ser. No. 772,225
8 Claims. (Cl. 152—352)

The invention relates to a pneumatic tire of novel construction and to a rim especially adapted for use therewith.

The present invention provides a pneumatic tire which is mounted on a rim so that it is supported only at the outside of the automobile and extends unsupported in cantilever fashion inwardly over the brake drum. In its preferred form the tire has its outer sidewall, that is the sidewall at the outside of the tire when it is mounted on the automobile, terminating in a bead which is mounted on a suitable bead seat on the rim. The other sidewall of the tire terminates in an elongated, rubberized-fabric flap which extends axially to the rim where it is mounted under the tire bead and is clamped forcibly against the rim by the pressure of the bead when the tire is mounted and in service. The rim takes the form of an annular trough which receives the tire bead and the underlying flap with a tight compression fit. When the tire is mounted on such a rim, it will form an air-tight assembly with any tendency of the flap to pull free being effectively resisted by the reaction of the bead against the supporting rim surfaces.

The assembly has the advantages of being light in weight and having a superior ride without sacrifice of stability. It enables a wheel of minimum diameter to be used without interfering with the requirements for an adequate braking surface; and it enables a rapid and convenient mounting of the tire on the rim and of the tire and rim assembly on the wheel.

It is an object of the invention to provide a pneumatic tire and rim assembly which is substantially lighter in weight than conventional assemblies. Another object is to provide a tire having a softer and smoother ride. Other objects are to provide a tire having a low, initial cost, which is safe and economical in operation and which is easy to mount and dismount.

These and further objects and advantages will be more fully apparent from the following description of the invention, reference being had to the accompanying drawings in which:

FIGURE 1 is a cross-sectional view of a pneumatic tire and rim assembly embodying one form of the invention;

FIGURE 2 is a fragmentary, sectional view showing an alternative form of rim construction in which the tire is intended to be vulcanized to the rim to form an integral assembly therewith;

FIGURE 3 is a view similar to FIGURE 2 showing another form of the invention in which the flap extension of the inner sidewall of the tire terminates in a beaded edge to enable it to be clamped more securely by the bead of the outer sidewall of the tire;

FIGURE 4 is a view similar to FIGURE 3 in which the tire bead is recessed slightly in its heel portion, enabling it to receive and to interlock with the beaded edge of the cooperating flap;

FIGURE 5 is a view similar to FIGURE 1 showing a modification of the rim in which an axial extension of the rim is provided to give positive support to the radially innermost portion of the flap; and FIGURE 6 is a view similar to FIGURE 1 showing a modification of the tire in which the tread of the tire is positioned inwardly and eccentrically of the central axis of the tire.

Referring first to FIGURE 1, the invention is shown as embodied in a tire and rim assembly which is especially adapted for tubeless tires and for use with passenger automobiles. The tire which is indicated generally at 10 comprises a tread 11, an outer sidewall 12 and an inner sidewall 13. The terms "inner" and "outer" are used to describe the tire as it is mounted on an automobile, the sidewall 12 being that sidewall at the outside of the automobile which is exposed to view and the sidewall 13 being that sidewall toward the inside of the automobile and which is normally hidden from the observer. Insofar as it is possible, the body of the tire is conventional in construction comprising four plies, 14, 15, 16 and 17, of rubberized, bias-cut fabric which give the desired strength to the tire. In the present example, the ends of the plies at the outside of the tire are wrapped about and anchored to a wire bundle 18 to form an outer tire bead 20.

The bead 20 which is otherwise of conventional construction differs from the usual tire bead in having a reverse taper. In a conventional tire bead the inside diameter of the bead increases outwardly from the toe to the heel of the bead; whereas, in the present example, the inside diameter is at a minimum at the heel 21 and the diameter then flares outwardly to the toe 22 at which point it is of maximum diameter.

The inner sidewall 13 does not terminate in an inextensible bead, as would be the case in conventional tires, but instead it extends axially in the form of a flap 23 which is intended to be snubbed about the bead 20 when the tire is mounted on a suitable rim, such as the rim indicated generally at 25 in FIGURE 1. The flap 23 preferably comprises an extension of the two outer plies 16 and 17 of the tire, these two plies extending beyond the inner plies 14 and 15 for a distance sufficient for the flap 23 to reach the bead 20 and to be wrapped around it. The plies 16 and 17 are covered on the inside by the conventional inner liner 26 of the tire and are covered on the outside by a layer of rubber 27 which comprises an extension of the rubber covering of sidewall 13.

The rim 25 is formed in the shape of an annular trough which is V-shaped in radial section to receive the reversely tapered bead 20. In this particular example, the disc 28 of the wheel extends outwardly to terminate in a diagonally-extending flange 29 which flares radially outwardly and axially inwardly, at an angle of about 60° from the vertical, to form a supporting surface for the bead 20 and for the marginal portion 30 of the flap 23 which is clamped between the bead and the flange 29.

The bead 20 is forcibly urged against the flange 29 by a removable side ring 31 which is secured to the disc 28 by bolts 32 and nuts 33 as shown. The side ring 31 extends in a substantially straight radial direction and terminates in a slightly rounded edge as indicated at 34. When the ring 31 is drawn tightly against the disc 28 by the nuts 23, it will force the bead 20 inwardly upon the flange 29 and will clamp the flap portion 30 securely between the bead and the flange. At the same time, the outer portion 35 of the ring 31 will force the marginal portion 36 of flap 23 tightly against bead 20.

When the assembly is complete, an air-tight seal is created between the flap portions 30 and 36 and the rim parts 29 and 35 and between the flap portions and the tire bead 20. Furthermore, the thickness of the flap portions and the inside diameter of the bead 20 are such as to produce a tight compression fit of the tire upon the rim. Inflation air is admitted to the interior of the tire by the valve 37 in the sidewall of the tire. Any tendency of the flap 23 to pull out from under the bead 20, either in response to the inflation presures or to the stresses of service, will pull the bead more tightly upon flange 29 and the flap will be gripped even more tightly between the bead and the rim. Thus the reactions between the various parts are such as to retain them in assembled position.

In the modification shown in FIGURE 2, the portions 30 and 36 of flap 23 are vulcanized to the bead 20 of the tire and also to the rim 40 so that the tire and the rim form an integral unit which can be readily mounted and dismounted by means of a nut and bolt arrangement similar to that shown in FIGURE 1. In this particular example, the rim 40 comprises an angularly extending flange 41 joined to a substantially radial flange 42 which is then folded back as indicated at 43 to form a radially inwardly extending portion 44. This rim configuration can be readily formed by conventional tool and die operations with the last crimping step being performed when the tire is assembled therewith. In this crimping step, the flange 41 has the position indicated in dotted lines. The tire flap and the tire bead are then placed in position against the flange 42 and the flange 41 is forced outwardly to take the solid line position as shown. The assembly is then placed in a suitable mold and subjected to heat and pressure so that the tire and the rim are vulcanized together.

In the modification of FIGURE 3, a rim similar to that of FIGURE 1 is used and accordingly corresponding reference numerals will be used wherever possible. In this particular form of the invention, the rim is recessed at the base of flange 29 to provide a groove, indicated at 50, which receives the beaded edge 51 of the flap 23. In this particular case, the pressure of the tire forces the marginal portion 30 tightly against the flange 29 and urges the bead 51 into the groove 50 thus effectively locking the parts together in assembled position.

In the modification of FIGURE 4, the heel 21 of the bead is recessed as indicated at 53 to receive a beaded edge 54 of the flap 23 as shown.

The modification of FIGURE 5 is quite similar to that of FIGURE 1, differing only in the provision of an axially extending support 55 extending from flange 29, the support underlies the flap 23 and supports it against radially inward deflection.

The modification of FIGURE 6 is also quite similar to that of FIGURE 1, but it differs in having the tread portion 57 of the tire displaced axially inwardly and eccentrically of the tire as shown. Under some conditions of service, a tread of this character and having this position has been found to give improved wear and service.

I claim:
1. In combination, a pneumatic tire and a rim therefor, said rim comprising an annular, substantially V-shaped trough, said tire comprising an outer sidewall terminating in a substantially inextensible bead seated in said trough and an unsupported inner sidewall having an axially extending flap integral with said inner sidewall and extending outwardly to terminate in a marginal edge portion clamped between the surfaces of said trough and said bead.

2. The combination of claim 1, in which said rim comprises a radial disc portion terminating in an inwardly directed conical flange surface forming one side of said V-shaped trough, and a removable ring portion comprising a radial surface adapted to be secured to said radial disc portion and having a flange portion forming the other side of said trough.

3. The combination of claim 1, in which said trough is vulcanized to said assembled flap and bead and has a portion adapted to be removably secured to the disc portion of an automotive wheel.

4. The combination of claim 1, in which said bead and flap in assembled relation have a tight compression fit with said rim.

5. The combination of claim 1, in which said tire has an inflation valve in the sidewall thereof.

6. In combination, a pneumatic tire and a rim therefor, said rim comprising an annular trough, said tire comprising an outer sidewall terminating in a substantially inextensible bead seated snugly in said trough and an inner unsupported sidewall, means extending from said inner sidewall outwardly to terminate at said bead and forming an air-tight seal therewith.

7. In combination, a pneumatic tire and a rim therefor, said rim comprising an annular trough, said tire comprising an outer sidewall having an inflation valve therein, said outer sidewall terminating in a substantially inextensible bead seated snugly in said trough and an inner unsupported sidewall, means extending from said inner sidewall outwardly to terminate at said bead and forming an air-tight seal therewith.

8. A pneumatic tubeless tire comprising an outer sidewall terminating in a substantially inextensible bead and an inner sidewall having an axially extending flap integral therewith and extending outwardly to terminate in a marginal edge portion adapted to be mounted under said bead and to form an air-tight seal therewith.

References Cited in the file of this patent
UNITED STATES PATENTS

| 129,655 | Craven | July 23, 1872 |
| 774,790 | Seddon | Nov. 15, 1904 |
| 1,377,162 | Forsyth | May 3, 1921 |
| 2,156,920 | Mitchell | May 2, 1939 |

FOREIGN PATENTS

| 12,191 | Great Britain | of 1907 |